United States Patent
Zheng et al.

(10) Patent No.: US 12,036,997 B2
(45) Date of Patent: Jul. 16, 2024

(54) METHOD FOR DRIVER HABITUATION TO SLIPPERY ROAD CONDITION

(71) Applicant: Ningbo Geely Automobile Research & Development Co., Ltd., Ningbo (CN)

(72) Inventors: Yijun Zheng, Västra Frölunda (SE); Linda Karlsson, Partille (SE); Måns Pihlsgård, Gothenburg (SE); Magnus Nilsson, Floda (SE)

(73) Assignee: Ningbo Geely Automobile Rese arch & Dev. Co., Ltd., Ningbo (CN)

( * ) Notice: Subject to any disclaimer, the term of this patent is extended or adjusted under 35 U.S.C. 154(b) by 316 days.

(21) Appl. No.: 17/704,753

(22) Filed: Mar. 25, 2022

(65) Prior Publication Data
US 2022/0212677 A1 Jul. 7, 2022

Related U.S. Application Data

(63) Continuation of application No. PCT/CN2020/114370, filed on Sep. 10, 2020.

(30) Foreign Application Priority Data

Oct. 3, 2019 (EP) .................................... 19201280

(51) Int. Cl.
*B60W 40/09* (2012.01)
*B60W 30/18* (2012.01)

(52) U.S. Cl.
CPC ...... *B60W 40/09* (2013.01); *B60W 30/18109* (2013.01); *B60W 2520/125* (2013.01); *B60W 2552/40* (2020.02)

(58) Field of Classification Search
CPC ........... B60W 40/09; B60W 30/18109; B60W 2520/125; B60W 2552/40; G09B 9/042; B60T 8/17551
See application file for complete search history.

(56) References Cited

U.S. PATENT DOCUMENTS

| 4,998,594 A | 3/1991 | Orloski |
| 6,024,381 A | 2/2000 | Mottola |

(Continued)

FOREIGN PATENT DOCUMENTS

| CN | 202383887 U | 8/2012 |
| CN | 104849065 A | 8/2015 |

(Continued)

OTHER PUBLICATIONS

International Search Report from corresponding International Application No. PCT/CN2020/114370, mailed on Dec. 8, 2020.

*Primary Examiner* — Yuen Wong

(74) *Attorney, Agent, or Firm* — Tucker Ellis LLP

(57) ABSTRACT

A method for vehicle driver habituation to slippery road condition. The method includes detecting a braking parameter indicative of driver invoked vehicle braking demand and/or one or more lateral acceleration parameters indicative of driver invoked vehicle lateral acceleration demand. The method further includes controlling the vehicle braking system to trigger vehicle skidding and/or reduced braking performance for simulating driving on slippery road behaviour when said braking parameter, said lateral acceleration parameter or a combination of said braking parameter and said lateral acceleration parameter: exceeds a threshold value, or is estimated would have resulted in vehicle skidding and/or reduced braking performance if the vehicle would have been driving with a low traction tire grip corresponding to a slippery road condition.

15 Claims, 5 Drawing Sheets

(56) References Cited

U.S. PATENT DOCUMENTS

| | | |
|---|---|---|
| 7,278,316 B2 | 10/2007 | Satou |
| 9,656,639 B1 | 5/2017 | Brooks |
| 9,858,829 B1 | 1/2018 | Brooks |
| 2008/0121323 A1 | 5/2008 | Karppinen |
| 2009/0138201 A1 | 5/2009 | Eckstein |
| 2009/0143937 A1 | 6/2009 | Craig |
| 2015/0298702 A1 | 10/2015 | Reinisch |
| 2017/0008335 A1 | 1/2017 | Howard |
| 2018/0204478 A1* | 7/2018 | Banga .................... G09B 9/042 |
| 2019/0168767 A1 | 6/2019 | Gaither |

FOREIGN PATENT DOCUMENTS

| | | |
|---|---|---|
| CN | 107576863 A | 1/2018 |
| EP | 1778505 A1 | 5/2007 |
| EP | 1783474 A1 | 5/2007 |
| FR | 2642876 A1 | 8/1990 |
| JP | 2003308006 A | 10/2003 |
| WO | 8402689 A1 | 7/1984 |

* cited by examiner

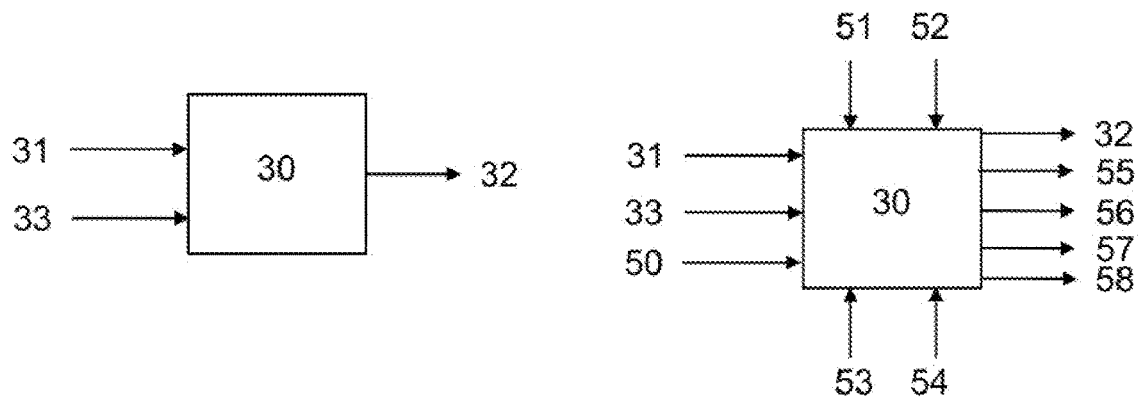
Fig. 10
Fig. 11
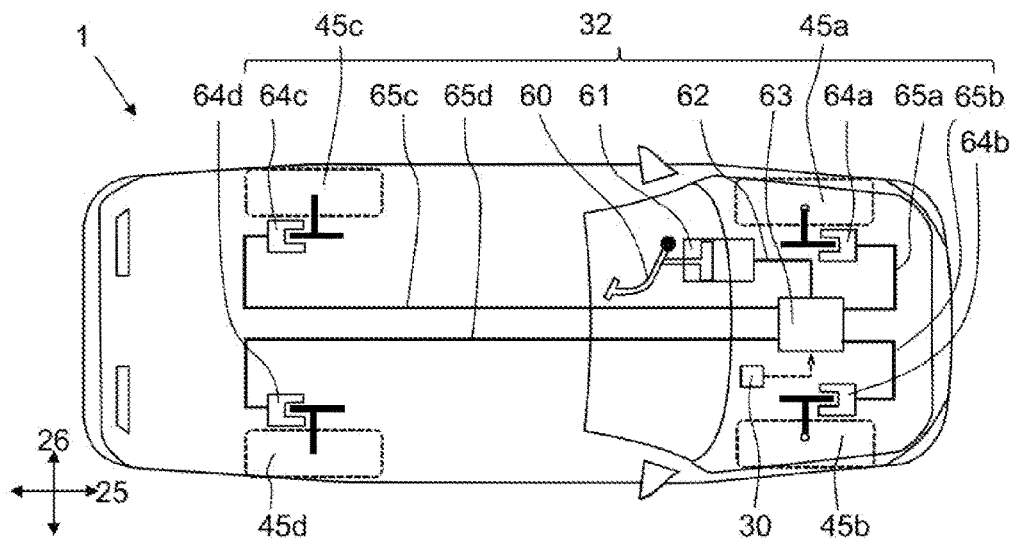
Fig. 12
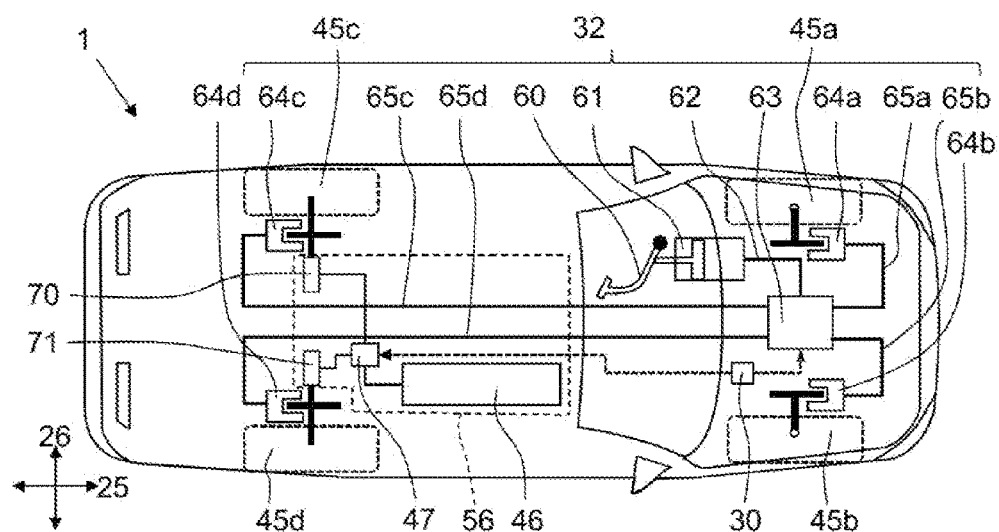
Fig. 13

METHOD FOR DRIVER HABITUATION TO SLIPPERY ROAD CONDITION

RELATED APPLICATION DATA

This application is a continuation of International Patent Application No. PCT/CN2020/114370, filed Sep. 10, 2020, which claims the benefit of European Patent Application No. 19201280.5, filed Oct. 3, 2019, the disclosures of which are incorporated herein by reference in their entireties.

TECHNICAL FIELD

The present disclosure relates to a method for vehicle driver habituation to slippery road condition. The disclosure further relates to a data processing control unit comprising a processor configured to perform a method for vehicle driver habituation to slippery road condition.

The method and data processing unit of the disclosure can for example be arranged in a vehicle, such as a car. However, the implementation and use of the method and control unit of the disclosure is not restricted to this particular vehicle, but may as well be installed in another type of vehicle, such as a truck, a bus, a rail vehicle, an off-road vehicle, a mining vehicle, an agriculture vehicle, a working vehicle such as a wheel loader or excavator, a motorcycle, or the like.

BACKGROUND

In the technical field of vehicle driver education and training it is known to provide vehicle driving conditions resembling those occurring when driving on for example a slippery road. For example, document EP1778505 A1 shows a device for reproducing the conditions of a slippery surface driving for a wheeled vehicle involving a removable tread which attaches to one or several wheels of the vehicle and whose adhesion power is lower than that of the wheels of the vehicle.

However, there are many disadvantages with this known solution, such as the relatively time consuming and difficult mounting of the removable tread, and the restricted use within a safe training area.

There is thus a need for an improved vehicle driver education and training solution for slippery road conditions that is more easily implemented for the driver and preferably less restricted in terms of usage conditions.

SUMMARY

An object of the present disclosure is to provide a method and control unit for vehicle driver habituation to slippery road condition where the previously mentioned problems are avoided. This object is at least partly achieved by the features of the independent claims.

According to a first aspect of the present disclosure, there is provided a method for vehicle driver habituation to slippery road condition. The method comprising detecting a value of a braking parameter indicative of driver invoked vehicle braking demand and/or a value of one or more lateral acceleration parameters indicative of driver invoked vehicle lateral acceleration demand. The method further comprising controlling the vehicle braking system to trigger vehicle skidding and/or reduced braking performance for simulating driving on slippery road behaviour when said value of said braking parameter, said value of said one or more lateral acceleration parameters or a combination of said value of said braking parameter and said value of said one or more lateral acceleration parameters: exceeds a threshold value, or is estimated would have resulted in vehicle skidding and/or reduced braking performance if the vehicle would have been driving with a low traction tire grip corresponding to a slippery road condition.

According to a second aspect of the present disclosure, there is provided a data processing control unit comprising a processor configured to perform a method for vehicle driver habituation to slippery road condition. The control unit being configured for detecting a value of a braking parameter indicative of driver invoked vehicle braking demand and/or a value of one or more lateral acceleration parameters indicative of driver invoked vehicle lateral acceleration demand, and controlling the vehicle braking system to trigger vehicle skidding and/or reduced braking performance for simulating driving on slippery road behaviour when said value of said braking parameter, said value of said one or more lateral acceleration parameters or a combination of said value of said braking parameter and said value of said one or more lateral acceleration parameters: exceeds a threshold value, or is estimated would have resulted in vehicle skidding and/or reduced braking performance if the vehicle would have been driving with a low traction tire grip corresponding to a slippery road condition.

Consequently, by appropriate control of the vehicle braking system in response to detected relative high level of braking demand and/or vehicle cornering, the vehicle may be arranged to perform actual vehicle skidding and/or experience reduced braking performance, such that driving on a slippery road may be simulated.

This simulated slippery road behaviour of the vehicle may thus be implemented in form an electronic driving training system in the vehicle that makes use of the existing vehicle braking system. Consequently, the method and control unit for vehicle driver habituation to slippery road condition according to the disclosure is a cost-efficient solution that may be easily implemented in large number of vehicles. Moreover, initiating and ending of a training session may be easily controlled by the driver via a suitable user-interface, thereby avoiding any need for mounting/dismounting of special physical equipment to the vehicle. Furthermore, depending on the type of implementation of the slippery road training method and system, and the level of autonomous driving capability of the vehicle, the slippery road training method and system according to the disclosure may be operated on normal roads during normal traffic conditions, thereby making the training method and system more accessible and thereby enabling more efficient driving training and habituation to slippery road conditions.

Further advantages are achieved by implementing one or several of the features of the dependent claims.

In some example embodiments, the braking parameter indicative of driver invoked vehicle braking demand is any or a combination of: brake hydraulic fluid pressure, brake pedal actuating position, brake pedal actuating force, generative braking torque, longitudinal deceleration.

In some example embodiments, the one or more lateral acceleration parameters indicative of driver invoked vehicle lateral acceleration demand is any or a combination of: steering wheel angular position and vehicle speed, front wheel steering angle and vehicle speed, front and rear wheel steering angle and vehicle speed, yaw rate and vehicle speed, lateral acceleration.

In some example embodiments, the step of controlling the vehicle braking system to trigger reduced braking performance is configured for simulating braking on a slippery road with zero or only little wheel side slip angle and involves generating reduced braking torque for a certain value of said braking parameter compared with normal braking torque, and the step of controlling the vehicle braking system to trigger vehicle skidding is configured for simulating cornering on a slippery road with a substantial wheel side slip angle for simulating driving on slippery road behaviour and involves braking and/or rotationally locking one, two or more appropriate wheels, in particular front outer and/or rear outer wheel for triggering understeering, and rear inner and/or front inner wheel for triggering oversteering. Thereby, authentic and realistic behaviour of the vehicle mimicking the vehicle behaviour when driving on slippery road surface is obtained.

In some example embodiments, the method further comprising obtaining a current tire-road friction coefficient, and controlling the vehicle braking system to trigger vehicle skidding and/or reduced braking performance for simulating driving on slippery road behaviour while taking the obtained current tire-road friction coefficient into account. Thereby, a more authentic and realistic vehicle behaviour may be generated by appropriate control of the vehicle braking system.

In some example embodiments, the threshold value is selected to reflect a level of simulated driving on slippery road behaviour, wherein a lower threshold value reflects increased vehicle slippery road behaviour, and wherein a higher threshold value reflects reduced vehicle slippery road behaviour. In other words, by adjusting the threshold level, the vehicle slippery road behaviour may be adjusted accordingly for simulating varying level of road slipperiness.

In some example embodiments, the threshold value is selected to reflect a certain fictive tire-road friction coefficient, wherein a lower threshold value reflects a low fictive tire-road friction coefficient, and wherein a higher threshold value reflects a high fictive tire-road friction coefficient. Hence, the fictive tire-road friction coefficient may be used as input for setting an appropriate threshold value.

In some example embodiments, the step of estimating vehicle skidding and/or reduced braking performance involves feeding the value of said braking parameter and/or the value of said one or more lateral acceleration parameters to a mathematical model of the vehicle dynamic driving behaviour. Thereby, a more authentic and realistic estimate of the vehicle behaviour if being driven on a slippery road surface may be calculated. Moreover, the required control of the braking system for generating such vehicle behaviour when being driven on a non-slippery road surface may also be calculated based on said vehicle model.

In some example embodiments, the step of estimating vehicle skidding and/or reduced braking performance involves feeding also a fictive tire-road friction coefficient to the mathematical model of the vehicle dynamic driving behaviour. Thereby, an estimated of the behaviour of the vehicle when being driven on a road having said fictive tire-road friction coefficient may be calculated.

In some example embodiments, the step of estimating vehicle skidding and/or reduced braking performance involves feeding also a current tire-road friction coefficient to the mathematical model of the vehicle dynamic driving behaviour. Thereby, the appropriate control of the vehicle braking system may be determined for accomplishing a desired vehicle behaviour reflecting driving on a slippery road surface.

In some example embodiments, the step of controlling the vehicle braking system to trigger vehicle skidding and/or reduced braking performance for simulating driving on slippery road behaviour when said value of said braking parameter, said value of said one or more lateral acceleration parameters or said combination of said values of said braking parameter and said value of said one or more lateral acceleration parameters is estimated would have resulted in vehicle skidding and/or reduced braking performance if the vehicle would have been driving with a low traction tire grip corresponding to a slippery road condition involves: feeding the value of said braking parameter, and/or the value of said one or more lateral acceleration parameters and the fictive tire-road friction coefficient to the mathematical model of the vehicle dynamic driving behaviour; calculating a fictive outcome of the vehicle driving behaviour; obtaining a current tire-road friction coefficient; and controlling the vehicle braking system to provide a real outcome of the vehicle driving behaviour that resembles the fictive outcome while driving on a road having the current tire-road friction coefficient.

In some example embodiments, the intervention in form of vehicle skidding and/or reduced braking performance for simulating driving on slippery road behaviour is only maintained over a time period of max 6 seconds, specifically max 4 seconds, and more specifically max 2 seconds. Thereby, the driver may be made aware of the upcoming slippery road condition and that a less aggressive driving style may be appropriate, without incurring any problems with having temporarily reduced braking performance and/or temporarily skidding vehicle.

In some example embodiments, the step of controlling the vehicle braking system to trigger vehicle skidding for simulating driving on slippery road behaviour additionally includes applying a compensating propulsion torque by means of a vehicle propulsion motor to a vehicle wheel that is not braked, wherein the compensating propulsion torque is arranged to at least partly compensate for the braking effect cause by triggering the vehicle skidding. Thereby, a more authentic and realistic driving experience id provided.

In some example embodiments, a level of simulated vehicle slippery road behaviour is controlled to automatically increase, or the fictive tire-road friction coefficient is controlled to automatically decrease, during a time-span of 2-15 weeks, specifically 4-10 weeks, ahead of an estimated yearly cold season's first day with sub-zero road temperature. Thereby, the driver may slowly adjust to the slippery road condition and avoid being surprised by sudden extensive vehicle skidding and/or reduced braking performance.

In some example embodiments, the step of controlling the vehicle braking system to trigger vehicle skidding and/or reduced braking performance for simulating driving on slippery road behaviour includes visually and/or audibly informing the driver about the intervention. Thereby, the driver may be assured that the behaviour of the vehicle was caused by a slippery road training assistant, and not caused by a vehicle malfunction.

In some example embodiments, the method additionally comprises operating a monitoring system for real time monitoring of vehicle surrounding traffic environment and for localisation of potential interfering external objects, and taking said potential interfering external objects into account for determining to what extent the vehicle braking system is allowed to trigger vehicle skidding and/or reduced braking performance. Thereby, more lengthy intervention of the vehicle braking system may be performed without risk for collision with external objects.

A vehicle comprising the data processing control unit.

Further features and advantages of the disclosure will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which FIG. 10 shows schematically a first example embodiment of the control unit and relevant input and output parameters, FIG. 11 shows schematically a further example embodiment of the control unit and relevant input and output parameters, FIG. 12 shows schematically a vehicle including the control unit as described above, and FIG. 13 shows schematically a vehicle as in FIG. 12 but additionally including a compensating propulsion torque arrangement.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
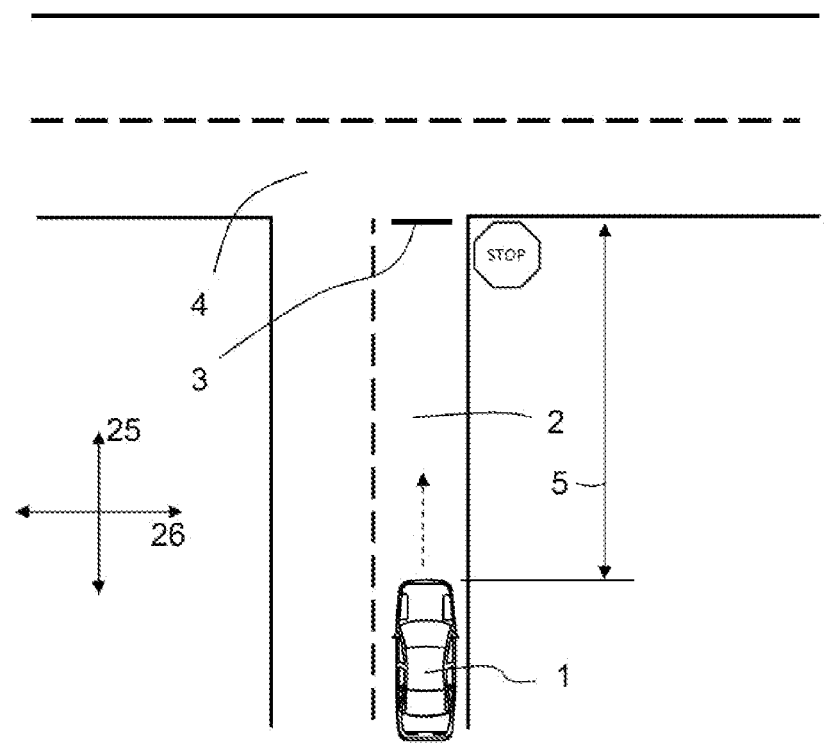
FIG. 1 shows schematically an overview of a road crossing and an approaching vehicle.

A first example embodiment of the method according to the disclosure will be described with reference to FIG. 1, which schematically shows an example vehicle driving situation, wherein a car 1 having a longitudinal direction 25 and a lateral direction 26 is driving along a straight section of a road 2 and approaching some kind of obstacle, such as a stop line 3 at a road crossing 4 shown in FIG. 1.

If the car would be equipped with conventional, normal, rubber tires, and if the driving situation would occur for example on conventional tarmac road material in dry or slightly wet road conditions, the tire-road friction coefficient will most likely be rather high, such as for example at least 0.5, or possible at least 0.7. However, if the car would be equipped with the same tires and the driving situation would occur on the same road material but during snowy or even icy road conditions, the tire-road friction coefficient will most likely be rather low, such as for example below 0.2.

Since the maximal vehicle braking force, or maximal vehicle lateral acceleration during cornering, is generally proportional to the tire-road friction coefficient, it is clear that the driver must take the current road condition into account for ensuring safe driving. Specifically, the driver must anticipate a significantly longer vehicle stopping distance 5, and less vehicle cornering capacity, when driving on roads having snowy and icy road conditions, i.e. slippery road conditions.

When the driver does not drive on slippery road conditions for a while, such as during summer season in geographical locations having warm summer weather, i.e. above zero degree Celsius and cold winter weather, i.e. below zero degree Celsius, vehicle drivers may tend to forget the necessary cautious and slippery road anticipating driving style that is necessary during subsequent winter season. As a result, accidents involving vehicles may occur during shift from summer to winter driving conditions, when the drivers are accustomed to good road grip and have not yet get used to the slippery road conditions generally associated with winter season.

The method, control unit and vehicle according to the present disclosure provides a solution for enabling the driver at least partly getting used to, or at least aware of, the slippery road condition in a safe and controlled manner before the actual slippery road condition begins. Thereby, the risk for accidents involving vehicles during shift from summer to winter driving conditions due to slippery road conditions may be reduced.

In short, slipper road vehicle driving behaviour may be accomplished by appropriate individual control of each of the car's wheel brakes, such that vehicle behaves as if it was driving on a road having slippery road condition. For example, with reference again to FIG. 1, if the driver upon approaching the vehicle crossing 4 applies a relatively high vehicle brake pedal force during dry or slightly wet road conditions in non-icy weather conditions, the vehicle would simply perform relatively high deceleration and stop before the stop line 3 in a controlled manner.

However, if the driver would carry out the same driving scenario and applying the same brake pedal force while having a vehicle slippery road driving-mode activated, the vehicle braking system may be controlled to provide reduced braking performance, thereby simulating longitudinal tire skidding on slippery road surface during vehicle braking. This would immediately make the driver aware of the potential slippery road condition, thereby contributing to increasing driver awareness of, and getting the driver habituated to, a coming season of real slippery road condition.

Figure 2:
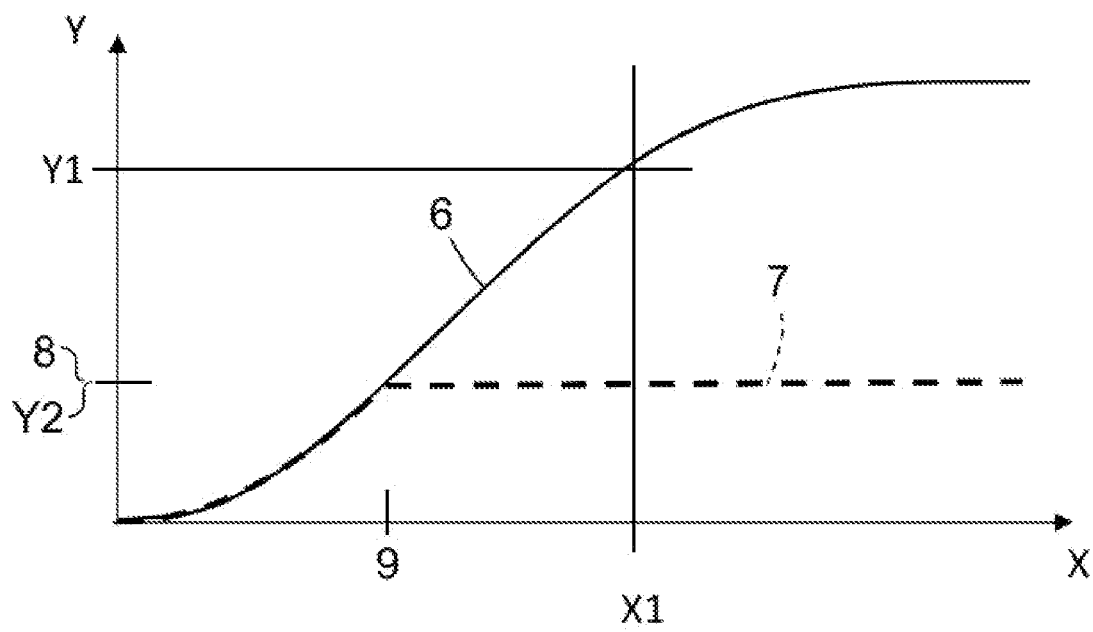
FIG. 2 shows schematically the reduced vehicle braking torque for a given level of brake pedal force when having the method for vehicle driver habituation to slippery road condition activated.

One example embodiment of reduced braking performance is schematically illustrated in the diagram of FIG. 2 depicting vehicle deceleration (m/s2) along a vertical axis (Y) as a function of brake pedal actuation force (N) along the horizontal axis (X). The solid line 6 illustrates actual vehicle deceleration as function of brake pedal actuation force when driving on dry road surface in warm, i.e. non-icy, road condition, and the dotted line 7 illustrates actual vehicle deceleration as function of brake pedal actuation force when driving on the same road surface during the same conditions, but having the vehicle slippery road driving-mode activated, thereby simulating driving on slippery road conditions. The vehicle braking system may thus for example be configured to set a fictive maximal deceleration level 8 corresponding to a simplified vehicle behaviour when braking on slippery road conditions, wherein a simulated activation of a vehicle ABS-system is performed at a certain brake pedal actuation force 9.

The specific implementation and functionality of the reduced braking performance may of course vary depending on the circumstances and the desired level of authentic vehicle behaviour. For example, vehicle deceleration a function of brake pedal force may include additional factors, such as vehicle speed, vehicle steering, transmission state, ABS operation, etc.

Figure 3:
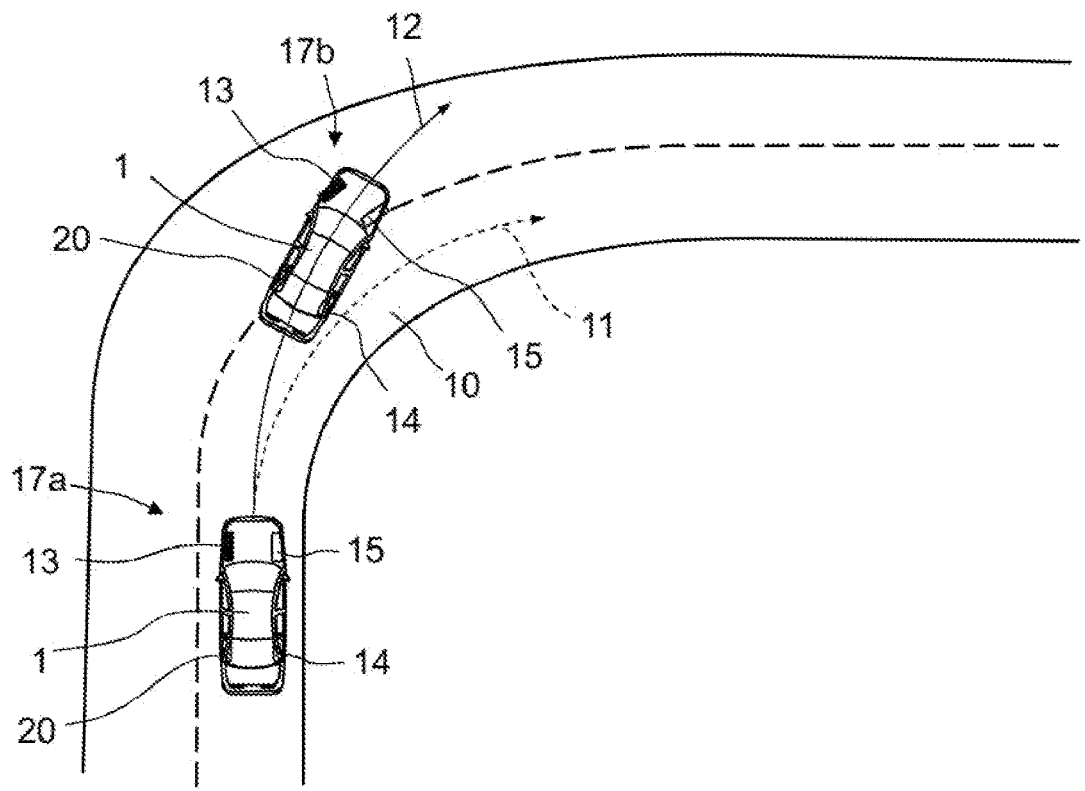
FIG. 3 shows schematically a vehicle understeering behaviour.

A further example driving scenario illustrating the effect of the simulated vehicle slippery mode behaviour is described with reference to FIG. 3, which shows a single vehicle 1 at an initial location 17a and about to drive through a road corner or bend 10. FIG. 3 also shows the vehicle 1 in a second location 17b corresponding to a subsequent time point in case of vehicle understeering. A similar behaviour may be experienced when turning in a crossing, or the like.

If the driver upon driving through the road corner or bend 10 applies a relatively large steering wheel angle in combination with high vehicle speed, while having dry or slightly wet road conditions in non-icy weather conditions, the vehicle will typically simply perform a controlled cornering with relatively high lateral acceleration of the vehicle, as illustrated by a first driving trajectory 11. However, if the driver when driving through the same corner 10 during the same weather and road conditions, and applying the same steering angle and the same speed, but having the slippery road driving-mode activated, the vehicle braking system may be controlled to for example trigger lateral tire skidding, thereby simulating for example vehicle understeering behaviour during cornering, as illustrated by a second driving trajectory 12. This would also immediately make the driver aware of the potential slippery road condition, thereby contributing to increasing driver awareness of, and getting the driver habituated to, a coming season of real slippery road condition.

The specific implementation and functionality of the simulated vehicle cornering behaviour may of course vary depending on the circumstances and the desired level of authentic vehicle behaviour. For example, additional factors, such as vehicle speed, vehicle steering rate of change, vehicle acceleration or braking torque, transmission state, etc., may be taken into account for determining a desired vehicle behaviour, such as understeering, oversteering, four-wheel sliding, etc.

Moreover, individual wheel brake control for accomplishing the desired vehicle behaviour, such as understeering, oversteering, four-wheel sliding, etc., despite driving on a non-slippery road surface, may be accomplished as follows: Understeering while cornering is typically triggered by individual and isolated braking of the front outer wheel 13, such that the front outer wheel 13 becomes rotationally locked. Braked wheel is marked with solid fill in the figures.

Due to vehicle roll dynamics and the suspension of the vehicle, there is a significant lateral load transfer to the outer wheels during cornering, meaning that the outer wheels transfer a much larger portion of the vehicle lateral force to the road. Therefore, considering that that a locked front wheel does not contribute to steering of the vehicle, rotational locking of the font outer wheel during cornering typically triggers understeering, at least during medium to low tire grip, such as during cold and/or wet tarmac.

In fact, a certain level of vehicle understeering may be accomplished even without rotational locking of the front outer wheel 13. For example, non-locking individual and isolated braking of the front outer wheel 13 and/or rear outer wheel 20 while driving through a curve will generally cause the vehicle to drift outwards in the curve, thereby exhibiting understeering. Still more alternatively, understeering while cornering may be triggered by individual and isolated braking of the front outer wheel 13, such that the front outer wheel 13 becomes rotationally locked, in combination with non-locked braking of the rear outer wheel 20. Non-locked braking herein refers to wheel braking with maintained wheel rotation.

Still more alternatively, understeering while cornering may be triggered by individual and isolated braking of the front outer wheel 13 and rear outer wheel 20, wherein the front outer wheel 13 is braked more than the rear outer wheel 20, i.e. so that the front outer wheel 13 provides a higher braking torque the rear outer wheel 20.

In general, braking of the vehicle outer wheels 13, 20 generates a vehicle braking torque vectoring that urges the vehicle towards a more straight driving path.

For improved simulated slippery road condition vehicle behaviour, any experienced braking effect of the braked front outer and/or rear outer wheel 13, 20 may be compensated by applying a corresponding propulsion torque to another wheel of the vehicle 1. Hence, when a vehicle control unit controls the vehicle braking system to trigger vehicle skidding for simulating driving on slippery road behaviour, the control unit may additionally control application of a compensating propulsion torque by means of a vehicle propulsion motor to a vehicle wheel 13, 14, 15, 20 that is not braked, wherein the compensating propulsion torque may be arranged to at least partly compensate for the braking effect cause by wheel braking triggering the vehicle skidding.

In other words, with reference again to FIG. 3, when the driver for example in high pace passes through a corner or bend 10, without braking and while having the vehicle slippery road driving-mode activated, for example the front outer wheel is individually braked, or even rotationally locked, by a control unit for triggering the desired understeering behaviour associated with slippery road driving conditions. However, since the driver has not actuated the brake pedal, a braking torque caused by the braking front outer wheel 13 may generate a less authentic driving experience for the driver. The same may of course occur when the driver passes through a curve 10 while the driver exerts for example a small vehicle braking force, but the vehicle brakes must stronger for triggering the understeering behaviour.

Therefore, for avoiding any experienced vehicle braking torque not caused by driver invoked corresponding actuation of the brake pedal, a compensating propulsion torque may be automatically applied to a non-braked wheel for eliminating any experienced braking torque other than that typically associated with actual understeering of the vehicle.

If vehicle understeering behaviour is desired, compensating propulsion torque may preferably be provided by rear inner and/or front inner wheel 14, 15 for further contributing to the understeering behaviour. This generates a vehicle propulsion torque vectoring that urges the vehicle towards a more straight driving path. However, if the resulting vehicle understeering behaviour is too great, a compensating propulsion torque may alternatively be provided by the rear outer wheel 20, possibly in combination with the rear inner wheel 14, for providing a desired level of understeering behaviour.

Such compensating propulsion torque may be generated by an available combustion engine and/or one or more electrical propulsion motors via the front and/or rear wheels.

Figure 4:
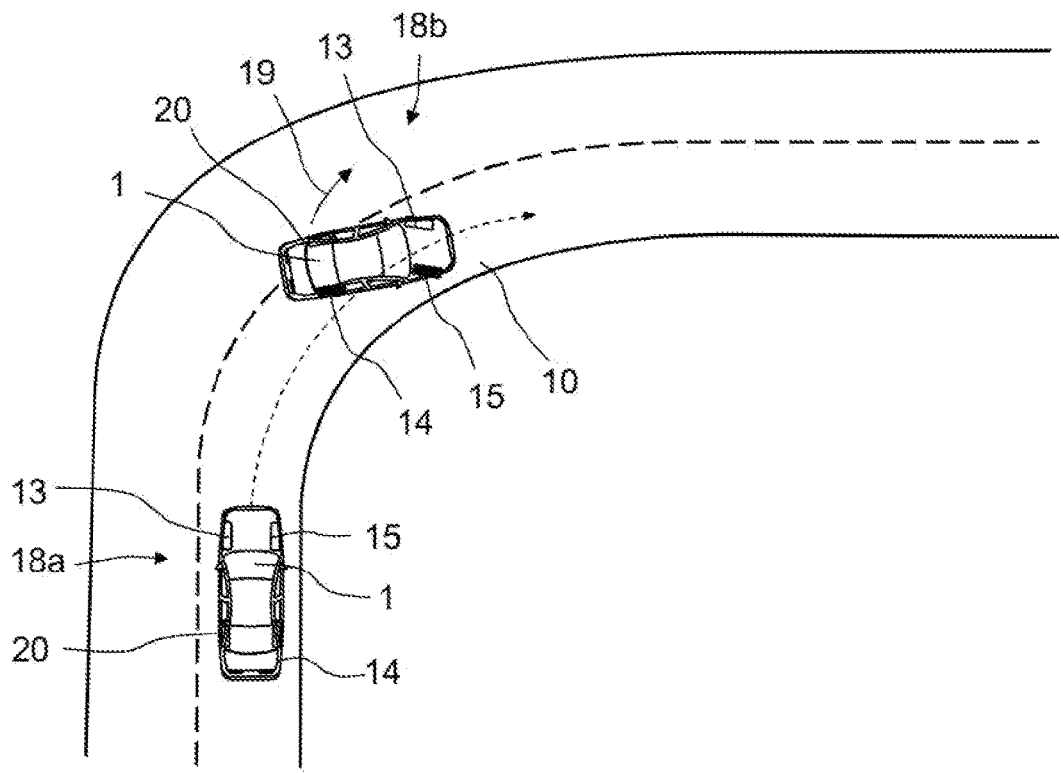
FIG. 4 shows schematically a vehicle oversteering behaviour.

A vehicle oversteering behaviour is described with reference to FIG. 4, which shows a single vehicle 1 at an initial location 18a and about to drive through the road corner or bend 10. FIG. 4 also shows the vehicle 1 in a second location 18b corresponding to a subsequent time point in case of vehicle oversteering, wherein the rear wheels 14, 20 experiences lateral side slip such that a rear end of the vehicle 1 tend to depart laterally outwards from the driving trajectory of the front wheels 13, 15. Such vehicle behaviour would also immediately make the driver aware of the potential slippery road condition, thereby contributing to increasing driver awareness of, and getting the driver habituated to, a coming season of real slippery road condition.

Individual wheel brake control for triggering a vehicle oversteering while cornering, despite driving on a non-slippery road surface, may be accomplished by individual and isolated braking of the rear inner wheel 14 and/or front inner wheel 15. In general, braking of the vehicle inner wheels 14, 15 generates a vehicle braking torque vectoring that urges the vehicle towards a drive path having a smaller radius, i.e. inwards towards a centre of curvature.

Moreover, if for example the rear inner wheel 14 is braked to exhibit rotational locking, the rear inner wheel will transmit significantly less lateral force, such the lateral force exerted on the rear outer wheel 20 increases and may even come to exceed its capacity, thereby causing the rear axle to loose grip. As a result, the vehicle experiences oversteering skidding behaviour, at least during medium to low tire grip, such as during cold and/or wet tarmac.

Oversteering while cornering may be triggered by individual and isolated braking of the front inner wheel 15 and rear inner wheel 14, wherein the front inner wheel 15 is braked more than the rear inner wheel 14, i.e. so that the front inner wheel 15 provides a higher braking torque the rear inner wheel 14.

During triggering of vehicle oversteering behaviour, compensating propulsion torque may preferably be provided for enhancing the authentic driving experience. Specifically, the compensating propulsion torque may be selected to compensate for any automatic braking torque used for triggering vehicle skidding.

If vehicle oversteering behaviour is desired, compensating propulsion torque may preferably be provided by rear outer and/or front outer wheels 20, 13 for further contributing to the oversteering behaviour. This generates a vehicle propulsion torque vectoring that urges the vehicle towards a smaller radius driving path.

If the vehicle has an electronic stability control (ESP), this control software may be automatically temporarily shut off, or controlled to automatically temporarily entering a special operating state allowing vehicle side slip, during such triggering of the vehicle for accomplishing understeering and oversteering for simulating slippery road conditions.

In addition to using the vehicle braking system for generating a vehicle behaviour resembling that of driving on a slippery road, also the vehicle steering system may be used when the vehicle has a steer by wire implementation, i.e. when there is no permanent mechanical rotational connection between the steering wheel and vehicle front wheels. Instead, the motion of the steering wheel is detected by an angular sensor and a steering actuator, such as electric, pneumatic or hydraulic actuator is connected to the front wheels, which and controlled to steer according to the input of the steering wheel. In such implementations, experienced understeering or oversteering of the vehicle may be easily implemented by simply introducing small deviations between the steering wheel motion and position and the output of said steering actuator.

The method for vehicle driver habituation to slippery road condition executed by individual control of the vehicle braking system for triggering vehicle lateral skidding and/or reduced braking performance may be implemented in various ways and with varying level of complexity.

Figure 5:
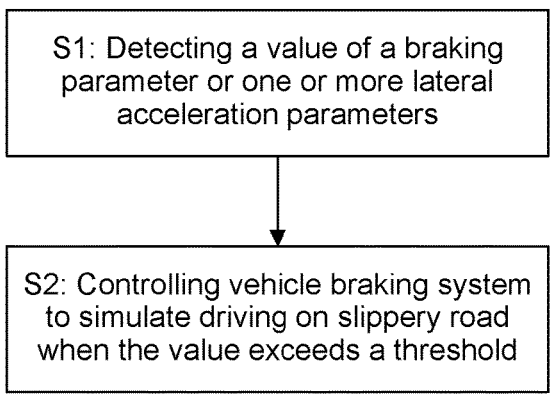
FIG. 5 shows schematically a first embodiment of a flowchart corresponding the basic steps of the disclosure.

FIG. 5 schematically illustrates the basic steps of a first example embodiment of the method for vehicle driver habituation to slippery road condition. Specifically, the method comprises a first step S1 of detecting a value of a braking parameter indicative of driver invoked vehicle braking demand and/or a value of one or more lateral acceleration parameters indicative of driver invoked vehicle lateral acceleration demand. The method further comprises a second step S2 of and controlling the vehicle braking system to trigger vehicle skidding and/or reduced braking performance for simulating driving on slippery road behaviour when said value of said braking parameter, said value of said one or more lateral acceleration parameters, or a combination of said value of said braking parameter and said value of said one or more lateral acceleration parameters exceeds a threshold value.

This example embodiment of the method for vehicle driver habituation to slippery road condition may be deemed corresponding to a relative easily implemented and non-complex approach, since it merely involves detection of a value of a relevant braking parameter and/or a value of one or more lateral acceleration parameters, and subsequent evaluation whether the detected value of the braking parameter, or the value of the one or more lateral acceleration parameters, or the combination of said value of said braking parameter and said value of said one or more lateral acceleration parameters, exceeds a threshold value, or not. This may for example be implemented using a simple pre-calculated lookup data table stored in a data memory.

Moreover, even if two, three or more braking parameters indicative of driver invoked vehicle braking demand and/or one or more lateral acceleration parameters indicative of driver invoked vehicle lateral acceleration demand are used as basis for the method, such as for example steering wheel angular position and vehicle speed, which are both relevant for determining level of vehicle lateral acceleration, the method may still be for example be implemented using a relatively simply multi-dimensional array lookup data table in a data memory.

The same applies when the method for example involves determining whether a combination of said value of said braking parameter and said value of said one or more lateral acceleration parameters exceeds a threshold value. This may be implemented by means of a multi-dimensional array lookup data table in a data memory. Alternatively, this may in less complex implementations be performed by using a mathematical function that, based on said values of said braking parameter and said one or more lateral acceleration parameters, delivers a single value that subsequently may be compared with said threshold value.

With respect to the first step S1, the braking parameter indicative of driver invoked vehicle braking demand may be any or a combination of: brake hydraulic fluid pressure, brake pedal actuating position, brake pedal actuating force, generative braking torque, or simply vehicle longitudinal deceleration.

Brake hydraulic fluid pressure may for example be detected by a pressure sensor installed in a hydraulic brake system. Alternatively, or in combination with above, a brake pedal actuating position may for example be detected by a position sensor install at the brake pedal for detecting its motion. Alternatively, or in combination with above, brake pedal actuating force may be detected by means of a force sensing resistor whose resistance changes as a function of pressure applied, or by a piezoelectric force sensor, or by means of a deformation sensor mounted on the brake pedal arm, such as a strain gauge based sensor. Alternatively, or in combination with above, generative braking torque produced by operating an electrical machine as a generator for converting kinetic energy to electrical energy may be detected by measuring the regenerative braking power produced. Still more alternatively, or in combination with above, vehicle longitudinal deceleration may for example be detected by means of a vehicle longitudinal acceleration sensor.

Furthermore, the one or more lateral acceleration parameters indicative of driver invoked vehicle lateral acceleration demand may be any or a combination of: steering wheel angular position and vehicle speed, front wheel steering angle and vehicle speed, front and rear wheel steering angle and vehicle speed, yaw rate and vehicle speed, lateral acceleration.

Steering wheel angular position may for example be detected by an angular sensor mounted on a moving part of the steering system, such as the steering column. Vehicle speed may be detected by a rotational sensor mounted on one or more vehicle wheels. Front wheel steering angle, or front and rear wheel steering angle, may be detected by means of angular sensor mounted to the pivoting wheel steering axis. Vehicle yaw rate may for example be measured by a gyro. Finally, vehicle lateral acceleration may be detected by a vehicle lateral acceleration sensor.

With respect to the second step S2, the step of controlling the vehicle braking system to trigger reduced braking performance is configured for simulating braking on a slippery road with zero or only little wheel side slip angle and involves generating reduced braking torque for a certain value of said braking parameter compared with normal braking torque for said value of said braking parameter.

In other words, with reference to FIG. 2, if for example the detected braking parameter is brake pedal actuation force and the value is X1, than a normal braking torque for said value X1 corresponds to Y1. However, the braking system is controlled to generate a reduced braking torque for said value X1, namely Y2, which may be deducted from stored and predetermined data underlying FIG. 2.

The second step S2 may alternatively, or in combination with above, involve control of the vehicle braking system to trigger vehicle skidding for simulating said driving on slippery road behaviour. Specifically, controlling the vehicle braking system to trigger vehicle skidding is configured for simulating cornering on a slippery road with a substantial wheel side slip angle for simulating driving on slippery road behaviour and involves locking one, two or more appropriate wheels, in particular front outer wheel for triggering understeering, and rear inner and/or front inner wheel for triggering oversteering.

The above-mentioned threshold value that is decisive for determining when the vehicle braking system should trigger vehicle skidding and/or reduced braking performance may be selected to reflect a level of simulated driving on slippery road behaviour, wherein a lower threshold value reflects increased vehicle slippery road behaviour, and wherein a higher threshold value reflects reduced vehicle slippery road behaviour.

In other words, the braking parameter may for example be brake pedal force and the threshold value may for example be set to 200 Newton. As a result, if the detected value of said braking parameter is for example 180 Newton, i.e. lower than the threshold value of 200 Newton, the vehicle braking system will not trigger vehicle skidding and/or reduced braking performance. However, if the detected value of said braking parameter is for example 220 Newton, i.e. exceeding the threshold value of 200 Newton, the vehicle braking system will trigger vehicle skidding and/or reduced braking performance.

The threshold value may subsequently be lowered to for example 175 Newton, thereby reflecting increased vehicle slippery road behaviour, as stated above. As a result, if the detected value of said braking parameter is for example 180 Newton, as before, it now exceeds the new threshold value and the vehicle braking system will consequently trigger vehicle skidding and/or reduced braking performance.

Consequently, considering that a low tire-road friction coefficient corresponds to high level of road slippery, and that a low threshold value also corresponds to high level of road slippery, the threshold value may be selected to reflect a certain fictive tire-road friction coefficient, wherein a lower threshold value reflects a low fictive tire-road friction coefficient, and wherein a higher threshold value reflects a high fictive tire-road friction coefficient.

According to a further aspect of the disclosure, the step of controlling the vehicle braking system to trigger vehicle skidding and/or reduced braking performance may additionally determine, and take into account, the magnitude between said value of said braking parameter, said value of said one or more lateral acceleration parameters, or a combination of said value of said braking parameter and said value of said one or more lateral acceleration parameters and said threshold value, and controlling the vehicle braking system to trigger vehicle skidding and/or reduced braking performance while taking into account said magnitude, i.e. the degree of difference.

As a result, the method may distinguish between driving situations where the said value of said braking parameter, said value of said one or more lateral acceleration parameters or a combination of said value of said braking parameter and said value of said one or more lateral acceleration parameters just barely exceeds said threshold value, and driving situations where the said value of said braking parameter, said value of said one or more lateral acceleration parameters or a combination of said value of said braking parameter and said value of said one or more lateral acceleration parameters greatly exceeds said threshold value. Consequently, the braking system may be controlled to trigger a more appropriate level of vehicle skidding and/or reduced braking performance, such that a more authentic and realistic driving experience is provided.

The method according to the disclosure may further comprise the step of obtaining a current tire-road friction coefficient, and controlling the vehicle braking system to trigger vehicle skidding and/or reduced braking performance for simulating driving on slippery road behaviour while taking the obtained current tire-road friction coefficient into account. Thereby, a significant improvement in terms of authentic and realistic vehicle behaviour may be accomplished, because an appropriate level of braking force may then be applied for accomplishing a desired amount and type of vehicle skidding.

The embodiments of the method for vehicle driver habituation to slippery road condition described above and relying on comparison with a threshold value for determining control of the vehicle braking system to trigger vehicle skidding and/or reduced braking performance is often sufficient but may in certain implementations possibly lack the required sophistication for fulfilling high demands on authentic slippery road driving experience. In such situations, it may be advantageous to implement an alternative example embodiment of the method for vehicle driver habituation to slippery road condition.

Figure 6:
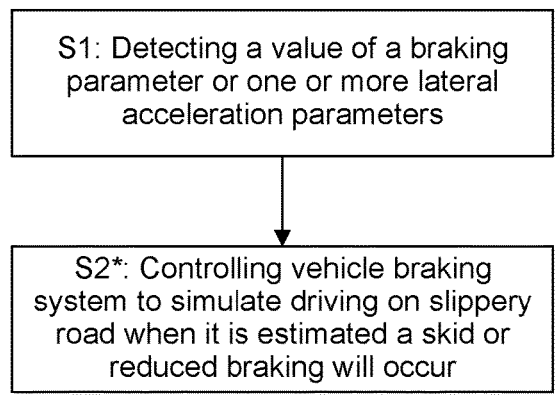
FIG. 6 shows schematically a second embodiment of a flowchart corresponding the basic steps of the disclosure.

Such an alternative embodiment of the method is schematically described below, and with reference to FIG. 6, and comprise a first step S1 of detecting a braking a value of a braking parameter indicative of driver invoked vehicle braking demand and/or a value of one or more lateral acceleration parameters indicative of driver invoked vehicle lateral acceleration demand. This first step S1 is thus identical as the first step described with reference to FIG. 5.

The second step S2* of the method involves controlling the vehicle braking system to trigger vehicle skidding and/or reduced braking performance for simulating driving on slippery road behaviour when said value of said braking parameter, said value of said one or more lateral acceleration parameters or the combination of said value of said braking parameter and said value of said one or more lateral acceleration parameters is estimated would have resulted in vehicle skidding and/or reduced braking performance if the vehicle would have been driving with a low traction tire grip corresponding to a slippery road condition.

The step of estimating the outcome of the vehicle behaviour in terms of vehicle skidding and/or reduced braking performance based on said braking parameter, said one or more lateral acceleration parameters, or said combination of said braking parameter and said one or more lateral acceleration parameters typically involves some type of calculation for providing said estimate. For example, said value of said braking parameter, said value of said one or more lateral acceleration parameters, or said combination of said value of said braking parameter and said value of said one or more lateral acceleration parameters may be used for calculating a resulting tire-road force level, i.e. the level of longitudinal and lateral force each wheel of the vehicle must transfer to the road surface for avoiding wheel slip, and thereafter the method may determine the vehicle behaviour if the vehicle would have been driving with a low traction tire grip corresponding to a slippery road condition, and finally controlling the braking system such that the vehicle behaves accordingly.

Low traction tire grip corresponding to a slippery road condition may for example correspond to a hypothetical maximal tire-road force level a wheel is deemed capable of providing when being used on a certain level of slippery road condition. The hypothetical maximal tire-road force level may be divided into hypothetical maximal longitudinal tire-road force level and hypothetical maximal lateral tire-road force level.

In other words, the method may involve controlling the vehicle braking system to trigger vehicle skidding and/or reduced braking performance for simulating driving on slippery road behaviour when said value of said braking parameter, said value of said lateral acceleration parameter, or said combination S2* of said value of said braking parameter and said value of said one or more lateral acceleration parameters is estimated resulting in a tire-road force level that exceeds a hypothetical maximal tire-road force level a wheel is deemed capable of providing when being used on a certain level of slippery road condition.

The hypothetical maximal tire-road force level a wheel is deemed capable of providing may for example be predetermined and stored in a data memory readily accessible for a data processing control unit. In particular, a set of different hypothetical maximal tire-road force levels, each associated with a specific road slipperiness, may be stored in said data memory.

Specifically, according to some example embodiments, the step of estimating vehicle skidding and/or reduced braking performance involves feeding the value of said braking parameter and/or the value of said one or more lateral acceleration parameters to a mathematical model of the vehicle dynamic driving behaviour. The mathematical model may be more or less sophisticated for providing an adequate combination of authentic driving experience cost-efficient implementation.

According to some examples, the step of estimating vehicle skidding and/or reduced braking performance involves feeding a fictive tire-road friction coefficient to the mathematical model of the vehicle dynamic driving behaviour. The fictive tire-road friction coefficient corresponds to the level of tire-road friction coefficient that vehicle is simulated to drive with.

For example, the, the fictive tire-road friction coefficient may be set to about 0.1 when the vehicle is simulated being driven on for example glare ice. Thereafter, the method estimates whether the vehicle, based also on input regarding said braking parameter, said one or more lateral acceleration parameters, or said combination of said braking parameter and said one or more lateral acceleration parameters, would have experienced vehicle skidding and/or reduced braking performance if the vehicle would have been driving with said fictive tire-road friction coefficient equal to 0.1. If the answer is yes, the vehicle would have experienced skidding and/or reduced braking performance. As a result, the method then comprises the step of controlling the vehicle braking system to trigger vehicle skidding and/or reduced braking performance for simulating driving on slippery road behaviour. However, if the answer is no, the vehicle would not have experienced skidding and/or reduced braking performance, then no such control of the vehicle braking system to trigger vehicle skidding and/or reduced braking performance for simulating driving on slippery road behaviour is performed.

According to yet some example embodiments, the step of estimating vehicle skidding and/or reduced braking performance may additionally involve feeding a current tire-road friction coefficient to the mathematical model of the vehicle dynamic driving behaviour. With knowledge also of the current tire-road friction coefficient the vehicle braking system may be much better controlled for providing a better and more authentic vehicle skidding and/or reduced braking performance.

Current tire-road friction coefficient may for example be estimated based on vehicle ambient temperature, knowledge of the road surface material, rain sensor signal, operating status and history of any of the vehicle driving assistance systems, such as ABS, ESP, etc., or input signal from road grip monitoring device, such as road surface camera, radar, laser or LIDAR equipment.

For example, the current tire-road friction coefficient is typically very different when driving on dry and warm tarmac compared with driving on wet and cold tarmac. Hence, if the method estimates that the vehicle, taking into account a detected value of said braking parameter, and/or said detected value of said one or more lateral acceleration parameters, would have experienced vehicle skidding and/or reduced braking performance if the vehicle would have been driving with a low traction tire grip corresponding to a slippery road condition, then it may be significant to have information about the current tire-road friction coefficient for being able to provide an authentic and realistic vehicle skidding and/or reduced braking performance, depending on the simulated level of slippery road condition. Otherwise, the method may apply too little or too much braking effect in individual tires, such that the desired simulated vehicle behaviour is not accomplished.

Figure 7:
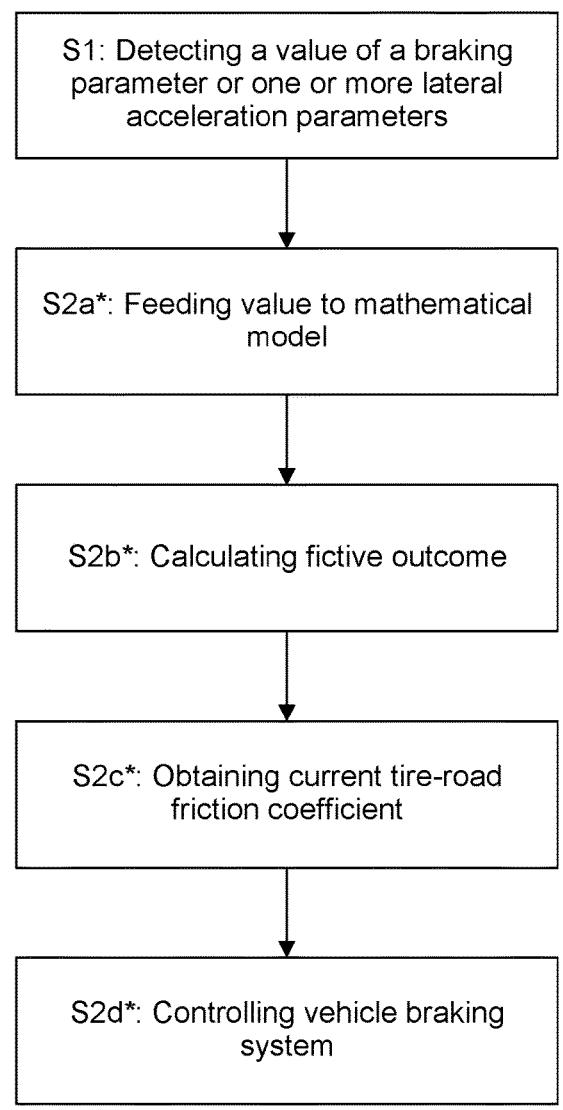
FIG. 7 shows schematically a third embodiment of a flowchart corresponding the steps of the disclosure.

Consequently, with reference to FIG. 7, a slightly more specific method for vehicle driver habituation to slippery road condition is described, comprising a first step S1 of detecting a value of a braking parameter indicative of driver invoked vehicle braking demand and/or a value of one or more lateral acceleration parameters indicative of driver invoked vehicle lateral acceleration demand. The method further comprises dividing the second step S2* of performing the control of the vehicle braking system to trigger vehicle skidding and/or reduced braking performance for simulating driving on slippery road behaviour when said value of said braking parameter, said value of said one or more lateral acceleration parameters, or a combination of said value of said braking parameter and said value of said one or more lateral acceleration parameters is estimated would have resulted in vehicle skidding and/or reduced braking performance if the vehicle would have been driving with a low traction tire grip corresponding to a slippery road condition, into four sub steps s2a*-S2d*, wherein the first sub step S2a* involves feeding the detected value of the braking parameter, and/or the detected value of the one or more lateral acceleration parameters and the fictive tire-road friction coefficient to the mathematical model of the vehicle dynamic driving behaviour.

The second sub step S2b* involves calculating a fictive outcome of the vehicle driving behaviour, based on said value of the braking parameter, and/or said value of the one or more lateral acceleration parameters, and the fictive tire-road friction coefficient. In other words, a fictive outcome of the vehicle behaviour is calculated reflecting that vehicle behaviour if the vehicle was indeed driving along a road having a tire-road friction coefficient condition corresponding to the fictive tire-road friction coefficient, and the driver requested a braking demand and/or a lateral acceleration demand corresponding to said detected values.

The third sub step S2c* involves obtaining a current tire-road friction coefficient, and the fourth sub step S2d* involves controlling the vehicle braking system to provide a real outcome of the vehicle driving behaviour that resembles the fictive outcome while driving on a road having the current tire-road friction coefficient. In other words, the vehicle is controlled to actually behave, including vehicle lateral and/or longitudinal sliding, with or without activated ABS braking, as if it was indeed driving on a slippery road having the fictive tire-road friction coefficient, despite for example actually driving on a dry or wet summer road having relatively good tire-road friction coefficient.

Thereby, a more authentic and realistic vehicle behaviour is accomplished that truly corresponds to driving the vehicle on a slippery road condition.

The method according to the disclosure is based on detection of a value of the braking parameter and/or a value of the one or more lateral acceleration parameters for controlling the vehicle braking system to trigger vehicle skidding and/or reduced braking performance for simulating driving on slippery road behaviour. However, also wheel acceleration torque may be used for providing additional relevant information about the vehicle dynamic operating behaviour. Wheel acceleration torque here refers to positive torque provided by a propulsion engine.

For example, cornering at a constant vehicle speed, i.e. with no wheel acceleration torque, may be performed without resulting in oversteering or understeering, but when performing the same cornering while applying high wheel acceleration torque the vehicle may directly begin to oversteer or understeer, depending on what wheel is being driven.

When taking also wheel acceleration torque into account, the method comprises detecting also a value of said wheel acceleration torque, and controlling the vehicle braking system to trigger vehicle skidding for simulating driving on slippery road behaviour when a combination of said value of said one or more lateral acceleration parameters and said value of said wheel acceleration torque: exceeds a threshold value, or is estimated would have resulted in vehicle skidding if the vehicle would have been driving with a low traction tire grip corresponding to a slippery road condition.

The various example embodiments of the method for vehicle driver habituation to slippery road condition described in the present disclosure has been primarily described as a training tool for preparing the driver to the coming slippery road season associated with icy or snowy roads. However, the method for vehicle driver habituation to slippery road condition is not restricted to training for icy or snowy roads. Instead, the method may be useful for training the driver also to other types of slippery roads, such as for example muddy roads, gravel roads, sand roads, or the like. Moreover, depending on how the individual wheel brakes of the vehicle braking system are actuated different types of slippery road surfaces can be simulated.

According to some example embodiments, the intervention in form of vehicle skidding and/or reduced braking performance for simulating driving on slippery road behaviour is only maintained over a time period of max 6 seconds, specifically max 4 seconds, and more specifically max 2 seconds. This may be deemed corresponding to a safety measure for reducing the risk for vehicle collision or vehicle driving of the road, or the like, because any vehicle skidding and/or vehicle reduced braking performance is then relatively quickly stopped, such that the driver more quickly can regain control over the vehicle. Furthermore, this short time period of experienced lack of control over the vehicle is generally sufficient for making the driver aware of the potential slippery road condition, thereby contributing to increasing driver awareness of, and getting the driver habituated to, a coming season of real slippery road condition.

According to yet a further aspect of the disclosure, the method may additionally comprise the step of generating a pulsating vehicle braking pedal during the braking event for trigger vehicle skidding and/or reduced braking performance. Thereby, since the driver typically is aware that a pulsating vehicle braking pedal corresponds to the vehicle Anti-Lock Braking (ABS) system in operation, the driver receives additional input indicating vehicle skidding due to apparent slippery road condition. In other words, by generating a pulsating vehicle braking pedal during the braking event for trigger vehicle skidding and/or reduced braking performance, the simulation effect reflecting vehicle behaviour when driving on slippery road is further strengthened.

As an alternative, or in combination with above, the vehicle may be provided with a monitoring system for real time monitoring of external surrounding traffic environment and for localization of potential interfering external objects. Thereby, the own vehicle's position relative to potential interfering external objects, e.g. the surrounding road infrastructure, such as roadsides, sidewalks, cycle tracks, traffic light, etc., as well as surrounding other traffic participants, such as other vehicles, bicycles, pedestrians, etc. Thereby, the method may arranged to take said potential interfering external objects into account for determining to what extent the vehicle braking system is allowed to trigger vehicle skidding and/or reduced braking performance.

Figure 8:
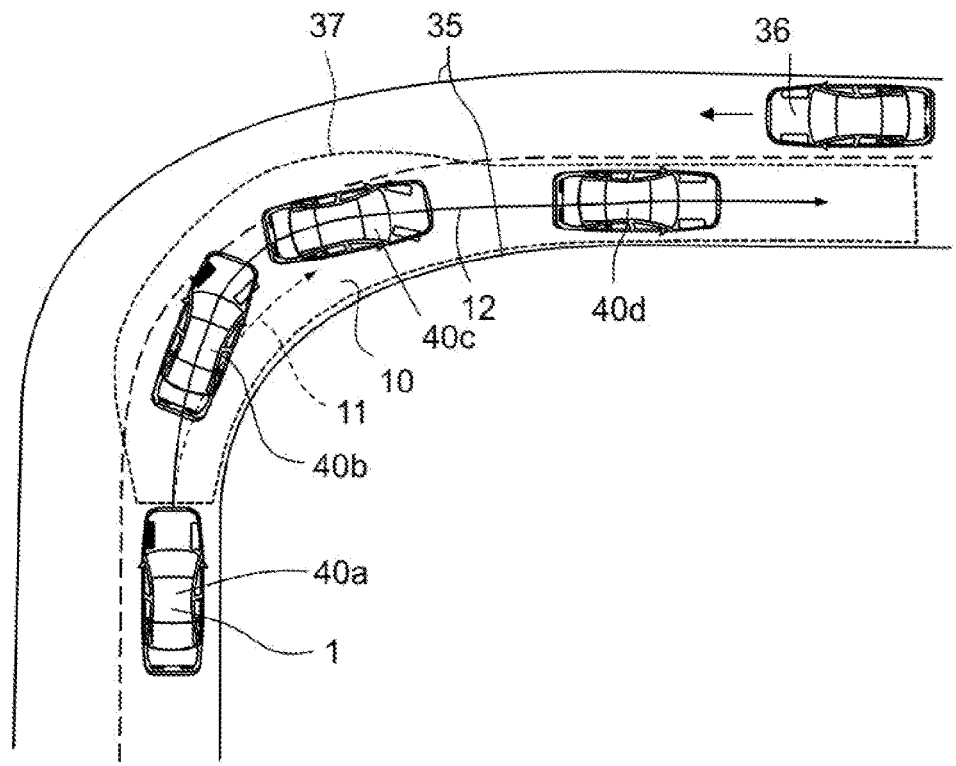
FIG. 8 shows schematically a traffic situation including safe boundaries of the vehicle, as well as an example of a resulting vehicle skidding behaviour.

This may for example be implemented by continuously determining safe boundaries for the vehicle, as schematically illustrated in FIG. 8, for determining to what extent the method for driver habituation to slippery road condition may intervene with the vehicle braking system.

FIG. 8 depicts an example driving situation where the vehicle 1 approaches a corner 10 and the monitoring system has detected the road boundaries 35 and a meeting vehicle 36 driving in the opposite direction as obstacles. Based on this information, the monitoring system continuously determines safe boundaries for the vehicle, as illustrated by the region encircled by the dotted line 37.

If the driver upon driving through the road corner or bend 10 applies a relatively large steering wheel angle in combination with high vehicle speed, while having dry or slightly wet road conditions in non-icy weather conditions, the vehicle will typically simply perform a controlled cornering with relatively high lateral acceleration of the vehicle, as illustrated by a first driving trajectory 11. However, if the driver when driving through the same corner 10 during the same weather and road conditions, and applying the same steering angle and the same speed, but having the slippery road driving-mode activated, the method and control unit according to the disclosure would control the vehicle braking system to trigger lateral tire skidding, thereby simulating for example vehicle understeering behaviour during cornering, as illustrated by a second driving trajectory 12. As a result, the vehicle would exhibit understeering from the initial position 40a to a second position 40b. At this time point, the method and control unit will terminate the intervention of the vehicle braking system, and thereby stopping the slippery road simulation, for ensuring that the vehicle 1 remain within the safe boundaries 37 of the vehicle 1. As a result, the driver may steer the vehicle back to the desired driving trajectory, as illustrated by the vehicle in subsequent third and fourth positions 40c, 40d.

Figure 9:
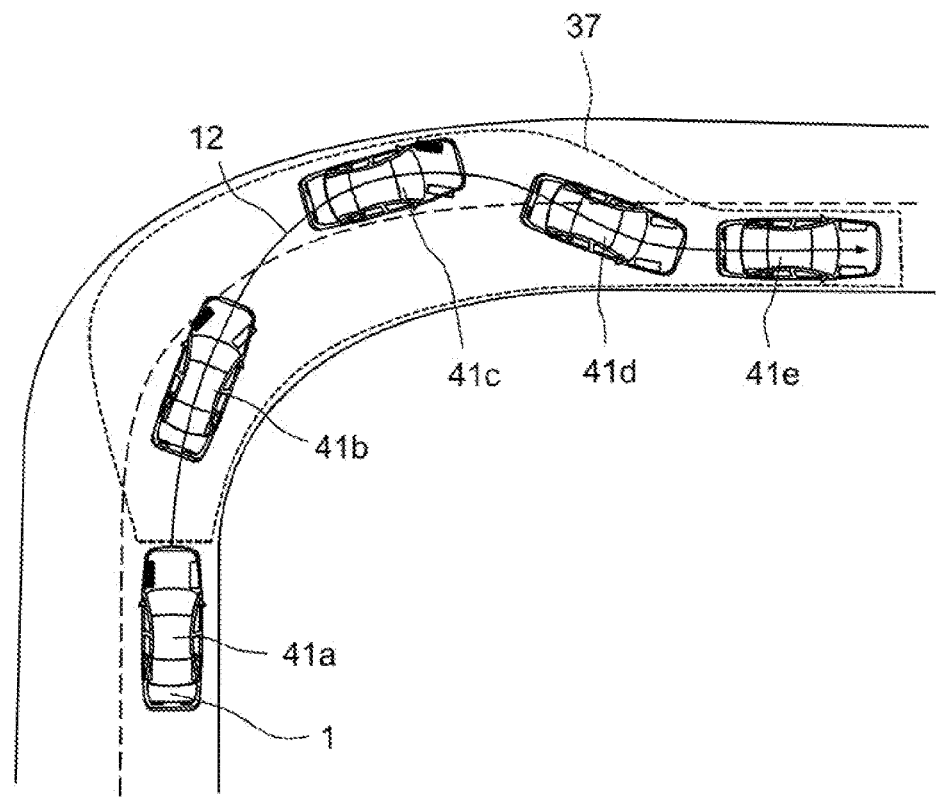
FIG. 9 shows schematically a different traffic situation including enlarged safe boundaries of the vehicle, as well as an example of a resulting vehicle skidding behaviour.

Still an example driving situation involving mapping of safe boundaries is illustrated in FIG. 9, which shows a similar driving situation as described with reference to FIG. 8, but here without a meeting vehicle 36 driving in the opposite direction. Based on this information, the system continuously determines safe boundaries for the vehicle, as illustrated by the region encircled by the dotted line 37.

The method and control unit according to the disclosure would here control the vehicle braking system to trigger lateral tire skidding, thereby simulating for example vehicle understeering behaviour during cornering, as illustrated by a second driving trajectory 12. As a result, the vehicle would exhibit understeering from the initial position 40a to a second position 41b and further to a third position 41c. At this time point, the method and control unit will terminate the intervention of the vehicle braking system, and thereby stopping the slippery road simulation, for ensuring that the vehicle 1 remain within the safe boundaries 37 of the vehicle 1. As a result, the driver may steer the vehicle back to the desired driving trajectory, as illustrated by the vehicle in subsequent fourth and fifth positions 41d, 41e.

An advantage of using the monitoring system for continuously determining safe boundaries of the vehicle is enabled prolonged intervention in form of vehicle skidding and/or reduced braking performance for simulating driving on slippery road behaviour, for example without any strict time limits. The method may then instead be configured to allow intervention in form of vehicle skidding and/or reduced braking performance for simulating driving on slippery road behaviour, as long as the vehicle autonomous driving assistance considers the driving to be within sufficiently safe boundaries, thereby providing a more authentic and realistic driving experience.

According to still a further example embodiment of the system of the disclosure, the method for vehicle driver habituation to slippery road condition is controlled to automatically become activated about 2-15 weeks, specifically 4-10 weeks, ahead of an estimated yearly cold season's first day with sub-zero degree Celsius road temperature. Thereby, the driver has sufficient time to slowly get used and familiar with the typical slippery road condition associated with slippery road season, and to adopt the driving style accordingly. Alternatively, or in combination with above, the method for vehicle driver habituation to slippery road condition may be activated and/or deactivated, by the driver, for example via an input device on the dashboard.

According to still a further example embodiment of the system of the disclosure, the level of simulated vehicle slippery road behaviour is controlled to automatically increase, or the fictive tire-road friction coefficient is controlled to automatically decrease, during a time-span of about 2-15 weeks, specifically 4-10 weeks, ahead of an estimated yearly cold season's first day with sub-zero degree Celsius road temperature. This arrangement ensures that the vehicle driver may slowly get used to and habituated with the vehicle driving behaviour when driving on a slippery road surface, such as over a certain number of weeks. Thereby, the driver is not faced with a sudden change of the vehicle behaviour, but instead a slower change of vehicle behaviour. In other words, the vehicle behaviour reflecting a slippery road condition is slowly ramped up for enabling the driver to slowly adopt the drive style to more and more slippery road surface.

Estimation of the date of the yearly cold season's first day with sub-zero degree Celsius road temperature may for example be based on data stored in remote server accessible via wireless data communication. The data may reflect expected start of the snowy, icy or winter season for each point on the globe. This data may for example be collected from other cars associated with the same vehicle OEM (Original Equipment Manufacturer), or same vehicle fleet, or from weather data.

When the snowy, icy or winter season typically associated with slippery road condition finally arrives, as for example determined based on the cold season's first day with sub-zero degree Celsius road or air temperature, the simulation of slippery road condition according to the disclosure may for example be temporarily turned off until the next years snowy, icy or winter season approaches. Alternatively, the simulation of slippery road condition may be kept operating during the snowy, icy or winter season for keeping up the driver's attention and awareness of the potentially slippery road condition.

The method may optionally include the step of visually and/or audibly informing the driver about any recent intervention for simulating slippery road condition. This may reassure and comfort the driver that nothing is wrong with the car, and that the recent unexpected and unusual behaviour of the vehicle was the result of simulated slippery road condition. The visual and/or audio information may for example be provided simultaneously with each activation of braking system for simulating the slippery road condition, and remain available to the driver for a certain time period after the end of each simulation event, such as for example 60 second. An indicator device that is actuated constantly when the slippery road training mode is activated may additionally, or alternatively, be provided, wherein said indicator device may be a massage, indicator, lamp, signal or the like located in the vehicle, such as on the dashboard.

FIG. 10 schematically shows an example embodiment of a data processing control unit 30 according to the disclosure, wherein the control unit 30 comprises a processor configured to perform the method for vehicle driver habituation to slippery road condition described above. The control unit 30 is configured for detecting a value of a braking parameter 31 indicative of driver invoked vehicle braking demand and/or a value of one or more lateral acceleration parameters 33 indicative of driver invoked vehicle lateral acceleration demand, and for controlling the vehicle braking system 32 to trigger vehicle skidding and/or reduced braking performance for simulating driving on slippery road behaviour when said value of said braking parameter 31, said value of said one or more lateral acceleration parameters 33, or a combination of said value of said braking parameter 31 and said value of said one or more lateral acceleration parameters 33: exceeds a threshold value, or is estimated would have resulted in vehicle skidding and/or reduced braking performance if the vehicle would have been driving with a low traction tire grip corresponding to a slippery road condition.

Even though the control unit 30 in FIG. 10 is illustrated including both said braking parameter 31 and a lateral acceleration parameter 33 as input, it is clear that the method of the disclosure may be performed with only one of said parameters 31, 33 as input.

The braking parameter 31 indicative of driver invoked vehicle braking demand is any or a combination of: brake hydraulic fluid pressure, brake pedal actuating position, brake pedal actuating force, generative braking torque, longitudinal deceleration. Moreover, the one or more lateral acceleration parameters 33 indicative of driver invoked vehicle lateral acceleration demand is any or a combination of: steering wheel angular position and vehicle speed, front wheel steering angle and vehicle speed, front and rear wheel steering angle and vehicle speed, yaw rate and vehicle speed, lateral acceleration.

FIG. 11 schematically shows a further example embodiment of a data processing control unit 30 according to the disclosure, in which values of additional parameters are supplied to the control unit and additional output actuators are controlled by the control unit 30 for providing an improved driving experience, in particular a more authentic and realistic vehicle behaviour resembling driving on a slippery road surface, such as a snowy or icy road surface, despite actually driving on a non-slippery road surface, i.e. driving on a dry or slightly wet road surface having a road temperature above zero degree Celsius.

In addition to a vehicle braking parameter 31 indicative of driver invoked vehicle braking demand, and one or more lateral acceleration parameters 33 indicative of driver invoked vehicle lateral acceleration demand, the control unit of FIG. 11 further receives values of the following parameters as input signals: wheel acceleration torque 50, current tire-road friction coefficient 51, fictive tire-road friction coefficient 52 that may reflect a slippery road condition, vehicle body motion dynamics 53, such as angular rate and X,Y,Z-acceleration, and vehicle speed 54.

Input data from these various sources together with for example a mathematical model of the vehicle dynamic behaviour enables the control unit 30 to make accurate and reliable estimation about the vehicle behaviour in case of driving on a road having the fictive tire-road friction coefficient 52.

If the control unit 30 concludes that the vehicle would indeed experience vehicle skidding and/or reduced braking performance if the vehicle would have been driving on said fictive tire-road friction coefficient 52, then the control unit 30 may control the vehicle braking system 32 to trigger vehicle skidding and/or reduced braking performance for simulating driving on slippery road behaviour. If the control unit 30 controls the braking system 32 to triggering vehicle skidding, the current tire-road friction coefficient 51 is taken into account for providing a desired amount, type and length of vehicle skidding.

Furthermore, the control unit 30 may additionally activating a pulsation generating arrangement 55 for providing a pulsating vehicle braking pedal during any driver invoked braking event triggering vehicle skidding and/or reduced braking performance.

Furthermore, the control unit 30 may additionally arrange generation of a compensation propulsion torque from a vehicle propulsion system 56, including for example an internal combustion engine and/or an electrical propulsion motor. The propulsion torque is the supplied to a non-braked wheel for compensating any loss of speed caused by the braking activation triggering said vehicle skidding.

In addition, the control unit may additionally control the vehicle steering system 57 independent from the motion of the steering wheel, such that vehicle behaviour involving for example understeering or oversteering due to slippery road surface easily may simulated.

Finally, the control unit may additionally arrange activation of the indicator device 58 for providing/triggering a message, indicator, lamp, signal or the like located in the vehicle, such as on the dashboard, when the slippery road training mode is activated and/or when the vehicle braking system is controlled to trigger vehicle skidding and/or reduced braking performance.

As described above, the implementation of the method according to the disclosure may take various forms, wherein a relatively straightforward and cost-efficient implementation is disclosed with reference to FIG. 10, and wherein a more complex example implementation is schematically illustrated with reference to FIG. 11. Clearly, various implementations with intermediate complexity, in which one or more of the various input signals or parameters and/or output signals or parameters describe with reference to FIG. 11 are omitted, may be realized.

FIG. 12 finally shows an example embodiment of a vehicle 1 having a front left wheel 45a connected to a front left wheel brake 64a, front right wheel 45b connected to a front right wheel brake 64b, a rear left wheel 45c connected to a rear left wheel brake 64c, and a rear right wheel 45d connected to a rear right wheel brake 64d.

The vehicle further comprises a data processing control unit 30 as described above. The control unit 30 receives input data (not showed) related to for example a value of a vehicle braking parameter 31 indicative of driver invoked vehicle braking demand, and/or a value of one or more lateral acceleration parameters 33 indicative of driver invoked vehicle lateral acceleration demand. The control unit 30 is arranged to control the vehicle braking system 32, which in the schematic illustration includes a brake pedal 60 mechanically connected to a master cylinder piston 61 via a pushrod. The master cylinder piston 61 is fluidly connected via a first hydraulic pipe 62 with a hydraulic valve unit 63 for distribution of hydraulic fluid to individual wheel brakes 64a-64d, as well as ABS-functionality, etc. The hydraulic valve unit 63 is subsequently fluidly connected to said wheel brakes 64a-64d associated with said wheels 45a-45d via individual hydraulic pipes 65a-65d, wherein each wheel brakes 64a-64d for example may include a caliper of a disc brake.

The control unit 30 is configured for enabling control of the brake system 32 to apply individual and separate brake torque of any wheel brake 64a-64d, separately from the actuation of the brake pedal 60.

According to a further example embodiment, the control unit 30 may additionally be configured for controlling also a vehicle propulsion system 56, as schematically illustrated in FIG. 13, The example propulsion system 56 is an electric propulsion system including a battery 46 for storing electrical energy, an electrical power converter 47, a left rear wheel electrical propulsion motor 70 drivingly connected to the rear left wheel 45c, and a right rear wheel electrical propulsion motor 71 drivingly connected to the rear right wheel 45d. Thereby, the control unit 30 may additionally control generation of a compensating vehicle propulsion torque on at least one wheel simultaneously with applying a braking torque on at least one other wheel.

The compensating propulsion torque may alternatively be provided by means of another type of electrical propulsion system, a combustion engine powered propulsion system, or a hybrid electric propulsion system. The vehicle propulsion system 56 may for example be configured for enabling compensating propulsion torque to be applied individually on each of the vehicles wheels, including front and rear wheels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the control unit 30, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/or transmitting data with external entities such as e.g. sensors arranged on the vehicle surface, an off-site server, or a cloud-based server.

Those skilled in the art will appreciate that the steps and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The processor(s) associated with the control unit 30 may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Although discussed above as methods described by the flowchart of FIG. 7, it should be appreciated that operations may be performed in another order and do not necessarily imply an order as provided. Rather, the methods discussed are merely one embodiment of the present disclosure as contemplated.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A method for enabling vehicle driver habituation to slippery road conditions to a driver, the method comprising:
   detecting a value of a braking parameter indicative of driver invoked vehicle braking demand and/or a value of one or more lateral acceleration parameters indicative of driver invoked vehicle lateral acceleration demand; and
   controlling a vehicle braking system including a plurality of wheel brakes for simulating driving on slippery road conditions to trigger vehicle skidding and/or reduced braking performance when said value of said braking parameter, or said value of said one or more lateral acceleration parameters:
   exceeds a threshold value, or
   is estimated would have resulted in vehicle skidding and/or reduced braking performance when the vehicle would have been driving with a low traction tire grip corresponding to the slippery road conditions.

2. The method according to claim 1, wherein the braking parameter indicative of driver invoked vehicle braking demand is any or a combination of: brake hydraulic fluid pressure, brake pedal actuating position, brake pedal actuating force, generative braking torque, or longitudinal deceleration.

3. The method according to claim 1, wherein the one or more lateral acceleration parameters indicative of driver invoked vehicle lateral acceleration demand is any or a combination of: steering wheel angular position and vehicle speed, front wheel steering angle and vehicle speed, front and rear wheel steering angle and vehicle speed, yaw rate and vehicle speed, or lateral acceleration.

4. The method according to claim 1,
wherein the step of controlling the vehicle braking system to trigger reduced braking performance is configured for simulating braking on a slippery road with zero wheel side slip angle involves generating reduced braking torque for a certain value of said braking parameter compared with normal braking torque, and
wherein the step of controlling the vehicle braking system to trigger vehicle skidding is configured for simulating cornering on the slippery road with a wheel side slip angle for simulating driving on slippery road conditions involves braking and/or rotationally locking one, two or more appropriate wheels, in particular front outer and/or rear outer wheel for triggering understeering, and rear inner and/or front inner wheel for triggering oversteering.

5. The method according to claim 1, further comprising obtaining a current tire-road friction coefficient, and controlling the vehicle braking system to trigger vehicle skidding and/or reduced braking performance for simulating driving on slippery road conditions while taking the obtained current tire-road friction coefficient into account.

6. The method according to claim 1, wherein the threshold value is selected to reflect a level of simulated driving on slippery road conditions, wherein a lower threshold value reflects increased vehicle slippery road conditions, and wherein a higher threshold value reflects reduced vehicle slippery road conditions.

7. The method according to claim 1, wherein the threshold value is selected to reflect a certain fictive tire-road friction coefficient, wherein a lower threshold value reflects a low fictive tire-road friction coefficient, and wherein a higher threshold value reflects a high fictive tire-road friction coefficient.

8. The method according to claim 1, wherein the step of estimating vehicle skidding and/or reduced braking performance involves feeding the value of said braking parameter and/or the values of said one or more lateral acceleration parameters to a mathematical model of a vehicle dynamic driving behaviour.

9. The method according to claim 8, wherein the step of controlling the vehicle braking system to trigger vehicle skidding and/or reduced braking performance for simulating driving on slippery road conditions when said value of said braking parameter, or said value of said one or more lateral acceleration parameters, is estimated would have resulted in vehicle skidding and/or reduced braking performance when the vehicle would have been driving with a low traction tire grip corresponding to a slippery road condition, involves the sub steps of:

feeding the value of said braking parameter, and/or the value of said one or more lateral acceleration parameters, and a fictive tire-road friction coefficient to a mathematical model of a vehicle dynamic driving behaviour;
calculating a fictive outcome of a vehicle driving behaviour;
obtaining a current tire-road friction coefficient; and
controlling the vehicle braking system to provide a real outcome of the vehicle driving behaviour that resembles the fictive outcome while driving on a road having the current tire-road friction coefficient.

10. The method according to claim 1, wherein the step of controlling the vehicle braking system to trigger vehicle skidding for simulating driving on slippery road conditions additionally includes applying a compensating propulsion torque by means of a vehicle propulsion motor to a vehicle wheel that is not braked, wherein the compensating propulsion torque is arranged to at least partly compensate for a braking effect caused by triggering the vehicle skidding.

11. The method according to claim 1, wherein an intervention in form of vehicle skidding and/or reduced braking performance for simulating driving on slippery road conditions is only maintained over a time period of max 6 seconds, specifically max 4 seconds, and more specifically max 2 seconds.

12. The method according to claim 1, wherein a level of simulated vehicle slippery road conditions is controlled to automatically increase, or a fictive tire-road friction coefficient is controlled to automatically decrease, during a timespan of 2-15 weeks, specifically 4-10 weeks, ahead of an estimated yearly cold season's first day with sub-zero road temperature.

13. The method according to claim 1, wherein the step of controlling the vehicle braking system to trigger vehicle skidding and/or reduced braking performance for simulating driving on slippery road conditions includes visually and/or audibly informing the driver about an intervention.

14. A data processing control unit comprising:
a processor configured to perform a method for enabling vehicle driver habituation to slippery road conditions to a driver, the processor being configured for:
detecting a value of a braking parameter indicative of driver invoked vehicle braking demand and/or a value of one or more lateral acceleration parameters indicative of driver invoked vehicle lateral acceleration demand, and
controlling a vehicle braking system including a plurality of wheel brakes for simulating driving on slippery road conditions to trigger vehicle skidding and/or reduced braking performance when said value of said braking parameter, or said value of said one or more lateral acceleration parameters:
exceeds a threshold value, or
is estimated would have resulted in vehicle skidding and/or reduced braking performance when the vehicle would have been driving with a low traction tire grip corresponding to the slippery road conditions.

15. A vehicle comprising the data processing control unit according to claim 14.

* * * * *